(12) United States Patent
Greenia (10) Patent No.: US 11,178,857 B1
(45) Date of Patent: Nov. 23, 2021

(54) AUTOMATIC AQUARIUM SIPHON SYSTEM

(71) Applicant: Thomas M. Greenia, Detroit, MI (US)

(72) Inventor: Maurice J. Greenia, Grosse Pointe, MI (US)

( * ) Notice: Subject to any disclaimer, the term of this patent is extended or adjusted under 35 U.S.C. 154(b) by 0 days.

(21) Appl. No.: 17/093,923

(22) Filed: Nov. 10, 2020

(51) Int. Cl.
*A01K 63/04* (2006.01)
*A01K 63/00* (2017.01)

(52) U.S. Cl.
CPC ......... *A01K 63/042* (2013.01); *A01K 63/006* (2013.01); *A01K 63/04* (2013.01); *A01K 63/047* (2013.01)

(58) Field of Classification Search
CPC ... A01K 63/042; A01K 63/006; A01K 63/047
See application file for complete search history.

(56) References Cited

U.S. PATENT DOCUMENTS

| | | | | |
|---|---|---|---|---|
| 192,595 | A * | 7/1877 | Sexton | B67D 7/54 141/59 |
| 1,576,462 | A | 3/1926 | Polzin | |
| 2,665,250 | A | 1/1954 | Willinger et al. | |
| 2,674,574 | A | 4/1954 | Pettas | |
| 3,110,754 | A | 11/1963 | Witort et al. | |
| 3,143,861 | A | 8/1964 | Dumas | |
| 3,255,731 | A | 6/1966 | Girard | |
| 3,696,789 | A | 10/1972 | Richard | |
| 3,903,844 | A | 9/1975 | Greenia | |
| 3,991,715 | A * | 11/1976 | Gibson, Jr. | A01K 63/006 119/249 |
| 4,951,699 | A | 8/1990 | Lipman | |
| 5,067,439 | A * | 11/1991 | Hand | A01K 63/006 119/249 |
| 5,230,298 | A * | 7/1993 | Pearce | A01K 63/003 119/250 |
| 5,634,433 | A * | 6/1997 | Schmitt | A01K 63/006 119/250 |
| 5,970,999 | A | 10/1999 | Greenia | |
| 6,848,395 | B2 * | 2/2005 | Deming, Jr. | A01K 63/006 119/249 |

FOREIGN PATENT DOCUMENTS

DE 934853 11/1955

* cited by examiner

*Primary Examiner* — Magdalena Topolski
*Assistant Examiner* — Katelyn T Truong
(74) *Attorney, Agent, or Firm* — Raggio & Dinnin, P.C.

(57) ABSTRACT

An automatic aquarium system that uses an automatic aquarium siphon bridge comprises a first water tank and a second water tank. The system further comprises a siphon bridge arranged between the first water tank and the second water tank. The system also comprises a pump arranged in one leg of the bridge. The aquarium system also comprises a cross over siphon arranged within the siphon bridge wherein one end of the cross over siphon is connected to an inlet of the pump and the opposite end is arranged in the second water tank. The automatic aquarium system may also comprise an air extraction siphon arranged between a top surface of the bridge and the inlet of the pump. This may allow for clean well aerated water to circulate throughout the automatic aquarium system, i.e., between the first and second tank via the bridge to allow for fish to properly enjoy two tanks and the bridge area therebetween.

17 Claims, 4 Drawing Sheets

AUTOMATIC AQUARIUM SIPHON SYSTEM

BACKGROUND OF THE INVENTION

1. Field of the Invention

The present invention relates generally to aquariums and siphons, and more specifically relates to an automatic aquarium siphon bridge for use between a first tank and a second tank to allow for fish to swim therebetween in properly aerated water.

2. Description of Related Art

A siphon is a leak proof solid channel, shaped and positioned to carry liquid from a source up and over an elevated point and down to an outlet at a lower level. A siphon must have at least its upper end submerged to allow atmospheric pressure to hold it full of liquid after it has been primed or filled, so that flow is powered by gravity. A siphon's elevation is the vertical rise from the liquid surface of the source to the crown of the siphon. Pressure within the elevated parts, which is every part in between the source surface and the crown of a working siphon, is always sub atmospheric. The maximum elevation of liquid in a siphon depends on the specific gravity (sg) of the liquid and atmospheric pressure. Water at 1.0 sg can be elevated in a siphon to no higher than about 34 feet at sea level. It should be noted that a fully operating siphon is very energy efficient. It moves liquid using only gravity for motive power and atmospheric pressure to hold liquid. But reliability of siphons needs improvement. Accidental starting or stopping of a siphon is often inconvenient, costly, or dangerous.

The first use of a submerged water pump to remove air from an enclosed space was by Otto Von Guericke in the 17$^{th}$ Century. The first fish bridge siphon that interconnected two aquariums appeared in 1877 in U.S. Pat. No. 192,595. Since then, many more such patents and multiple experiments for similar purposes with regards to aquariums have been tried with much hopeful enthusiasm but not notable success. In fact, none of the prior art patents include a practical new method of extracting air. Many of the prior art fish bridge siphons are found in U.S. Pat. Nos. 1,576,462; 3,930,844; 5,067,439 and 3,230,298. Many other fish display siphons for an aquarium have very complex designs and may be found in U.S. Pat. Nos. 5,282,438 and 5,605,115. The inventors previous U.S. Pat. No. 597,099 is the only one that uses a water pump to extract air. However, in this patent the air extraction was slow, over heated the pump and displayed excessive complexity. Even so, it did demonstrate that a water pump could start a siphon by extracting air therefrom. The inventors other prior U.S. Pat. No. 3,903,844 included circulation of aerated and filtered water in a double tank fish bridge siphon. A smaller siphon was built into the back edge of the fish bridge. The small opening at the crown of the smaller siphon interconnected the two siphons. Water flowed slowly through the smaller siphon to the inlet of an air bubble pump in one tank and returned to the other tank through the larger siphon. The interconnection ensured that neither siphon could carry water if the other stopped flowing. This effectively prevented tank overflow.

Therefore, there is a need in the art for an improved automatic aquarium siphon bridge that more effectively extracts air via a branch inlet device while using less power and with no external tubing. There is also a need in the art for an inventive way of extracting air from an enclosed space by applying well known principles such that fish may swim in properly aerated clear clean water safely and through a spacious transparent bridge that interconnects to conventional well filtered aquarium tanks. There also is a need in the art for an aquarium siphon bridge that allows for a better way to see fish while also having automatic circulation of water and air throughout the system to ensure the survival of the fish.

SUMMARY OF THE INVENTION

One object of the present invention may be that it provides an improved aquarium bridge.

Another object of the present invention may be that it provides an automatic aquarium siphon bridge that continuously circulates water and air therethrough between a first tank and a second tank.

Still a further object of the present invention may be that it provides an automatic aquarium siphon bridge that uses a pump with a branch inlet device to control a flow to extract air faster while using less power, with no external tubing.

Another object of the present invention may be that it provides an automatic aquarium siphon bridge that extracts air from an enclosed space in order to allow properly aerated water to flow between a first tank and a second tank through a siphon bridge.

Still a further object of the present invention may be that it provides an automatic aquarium siphon bridge that uses three siphons to move the water between two tanks through the bridge.

Yet another object of the present invention may be that it provides an automatic aquarium siphon bridge that is capable of automatic operation, while having enhanced fish viewing.

Still another object of the present invention may be that it provides an automatic aquarium siphon bridge that includes pressure resistance siphon construction.

According to the present invention, the foregoing and other objects and advantages are obtained by a novel design for an automatic aquarium system. The automatic aquarium system comprising a first water tank and a second water tank. The automatic aquarium system also comprising a pump arranged in one leg of a siphon bridge. The system also comprises a siphon bridge arranged between the first water tank and the second water tank. The automatic aquarium system also comprises a cross over siphon arranged within the siphon bridge where one end of the cross over siphon is connected to an inlet of the pump. The automatic aquarium system also includes an air extraction siphon arranged between a top surface of the siphon bridge and an inlet of the pump. The use of a submerged pump along with the three siphons allows for circulation of water and air continuously throughout the tanks and bridge.

One advantage of the present invention may be that it provides for an improved aquarium bridge.

Still another advantage of the present invention may be that it provides for an automatic aquarium siphon bridge for use with a first and second tank which allows for the automatic circulation of water and air throughout the aquarium system.

Yet another advantage of the present invention may be that it provides for an automatic aquarium siphon bridge that extracts air from an enclosed space to allow for water to flow from a first tank to a second tank through a siphon bridge.

Another advantage of the present invention may be that it provides for an automatic aquarium siphon bridge that uses three siphons to continuously move water between a first tank and a second tank through a bridge.

Yet another advantage of the present invention may be that it provides for an automatic aquarium siphon bridge that automatically operates to move the water through the aquarium system while giving an enhanced view for the fish in a transparent bridge.

Still another advantage of the present invention may be that it provides for an automatic aquarium siphon bridge that has pressure resistance siphon construction to ensure structural failure from the force of differential pressure does not occur.

Still another advantage of the present invention may be that it provides for an automatic aquarium siphon bridge that has an enhanced aeration of the water which includes added aeration with no air pumping.

Yet another advantage of the present invention may be that it provides for an automatic aquarium siphon bridge that allows for an insertion of dried fish food into an open leg of the bridge in order to allow fish to eat within the bridge.

Yet another advantage of the present invention may be that it provides for an automatic aquarium siphon bridge that may have any shape siphon used therewith.

Still another advantage of the present invention may be that it provides for an automatic aquarium siphon bridge that allows for the continuous circulation of air and water throughout the entire first, second and any other number of tanks and bridges used therewith.

Other objects, features and advantages of the present invention may become apparent from the subsequent description and appended claims, taken in conjunction with the accompanying drawings.

BRIEF DESCRIPTION OF THE EMBODIMENT(S)

Referring to the drawings, there is shown an automatic aquarium system or automatic aquarium siphon system 10 according to an embodiment of the present invention. The automatic aquarium system 10 of the present invention is generally used with a first aquarium water tank 12 and a second aquarium water tank 14 with a bridge or siphon bridge 16 arranged therebetween. However, it should be noted that any other number of aquarium water tanks and any other number of bridges 16 may also be used in the automatic aquarium system 10 according to the present invention. The automatic aquarium system 10 of the present invention may have continuous aerated water flow, thus allowing for healthy and growing fish to swim contentedly amid the endless air bubbles and the clean water which is circulating through the spacious and brightly viewable transparent bridge 16 that interconnects the first and second conventional filtered aquarium tanks 12,14 as described above. Each tank 12, 14 may have a filter 60 arranged therein. A filter inlet or strainer 62 may be arranged on a filter tube end. An innovative way of extracting air from the enclosed space, i.e., the interior of the bridge 16 may be used to keep the water flowing from the first tank 12 to the second tank 14 via the bridge 16. It should be noted that secured in the bottom of one of the legs of the siphon bridge 16 is a small centrifugal water pump 18 that has a three flow controlled inlet branch or member 20. It should be noted that a strainer protected primary water branch 22 is close above the pump inlet member 20 that allows in flowing water to continuously cool and lubricate the pump 18. Another of the branches 24, which is the narrowest branch and has the lowest negative pressure, is connected to a smaller diameter flowing air extraction siphon tube that removes air from the top of the bridge 16. Therefore, as the air passes through the water pump 18 an equivalent volume of water is pushed up into the bridge 16 by atmospheric pressure. Therefore, with no sudden pressure increase there is no cavitation within the pump 18. The remaining inlet branch 26 of the pump 18 allows water from the opposite tank to enter therein through a cross over siphon 28, but not until the water level rises enough to allow a return flow through the siphon bridge 16. Hence, when the bridge 16 is full pressure at its top is about half a pound per square inch lower than atmospheric pressure. Therefore, a small air valve 30 may be included on one side of the bridge 16 and may be opened just enough to let atmospheric pressure force air in at a rate such that along with the water therein, is continuously moved from the top of the bridge 16 through the down flowing air extraction siphon tube 32. The automatic aquarium system 10 of the present invention provides a better way to see what the fish do while automatic circulation of water and air throughout the automatic aquarium system 10 relies on the fundamental facts of siphons to work. It should be noted that the present invention of an automatic aquarium system 10 uses three different siphons that have negative pressure in the water and air of their upper parts. It should be noted that the amount of dissolved air that water can hold decreases as a siphon goes higher. Furthermore, fish breathe when dissolved oxygen goes into their blood as aerated water passes through their gills. For healthy fish, the water supply must hold a plentiful amount of dissolved air. Therefore, when water splashes and bubbles, i.e., more air dissolves in it, the fish are capable of living therein. If there is negative pressure in a siphon full of water, aeration needs to be assisted therein as much as possible because of the negative pressure. Therefore, an atmospheric air inlet 30 produces air saturated water to circulate throughout the automatic aquarium siphon bridge 16 and tanks 12,14. It should be noted that the maximum height of a siphon where fish still can get enough oxygen may be approximately a ten foot tall siphon.

As shown in the drawings, the present invention of an automatic aquarium siphon system 10 includes a first tank 12 having a generally rectangular or square shape. However, it should be noted that any other shaped tank may also be used. The automatic aquarium siphon system 10 also may include a second aquarium water tank 14 generally having a rectangular or square shape depending on the design thereof. However, it should be noted that any other shaped aquarium tank, such as circular, triangular, random shape or any unknown shape may also be used for either the first or second tank 12,14 according to the present invention. Also, it should be noted that more than two tanks may also be used in the system 10. Also, the automatic aquarium siphon system 10 may include a siphon bridge 16 generally having a U-shape when viewed from the side. However, it should be noted that any other shape of bridge 16 may be used for the automatic aquarium siphon system 10, such as a triangular shape, half moon shape or any other known shape, however a generally squared off U-shape, as shown in the drawings, may also be used. The generally U-shape bridge 16 may have a first leg extending into the first aquarium tank 12 of the system 10 and a second leg thereof extending into the second tank 14 of the automatic aquarium siphon system 10 according to the present invention. It should be noted that the siphon bridge 16 may have any known design shape with any known size. The siphon bridge 16 may include a surface that rests directly on a side edge of the first water tank 12 and the second water tank 14 or it may include a brace that holds the bridge 16 either by resting on the bottom surface of the first and second tank 12,14 or connected to an inner wall of the first and second tank 12,14. Arranged inside one of the legs near a bottom of that leg is a submersible pump 18. The submersible pump 18 may be connected to the inside surface of one of the legs of the bridge 16 via any known brace or bracket 34. It should be noted that the siphon bridge 16 and brace 34 may be made of any known plastic, ceramic, composite, metal, steel or natural material depending on the design requirements. In the contemplated embodiment, a first and second disc is arranged at the end of a pole like member with one of the disc secured to an outer surface of the submersible pump 18, while the other is secured to an inside surface of the first leg of the siphon bridge 16. The siphon bridge 16 may have any known shape or cross section, such as the square cross section shown in the figures, however any other shape cross section may be used for the bridge 16 and the legs of the bridge 16. The siphon bridge 16 generally is made of Plexiglas or other transparent material and the various components of the bridge 16 may be secured together via either cement, glue, or any other known mechanical or chemical fastening technique or methodology.

The automatic aquarium siphon system 10 as noted above uses three different siphons that have negative pressure in the water and air of their upper parts. Each one of the siphons is a vitally necessary part of the integrated automatic aquarium siphon system 10 that circulates clean, well aerated water flowing throughout its constituent parts. The first of the siphons is the pumped powered cross over siphon 28, which carries water in a direction opposite to what gravity would normally do. The second of the three siphons is the pump powered air extraction siphon 32, which has air flow through the air extraction down flowing leg siphon tube and fills the bridge 16 with water. The up flowing leg of the same siphon is the bridge 16, which holds the air and water that is forced upward by atmospheric pressure. The third siphon is the bridge siphon 16, which is a gravity powered siphon that carriers water from a slightly higher elevation to a slightly lower one. These three siphons, the cross over siphon 28, the air extraction siphon 32 and the bridge siphon 16 all work in unison to circulate clean well aerated water throughout its parts. It should be noted that each of the three intakes that carry water or air to the pump inlet 20 may have a strainer 36 on the end thereof. The strainer 36 is fine enough to prevent entry by the smallest fish or by solid particles that might clog the flow therein. Therefore, the cross over siphon inlet has a strainer 36 at its entry in the second aquarium tank 14, while the primary water branch inlet 22, which is directly above the pump 18 has a strainer 36 arranged on an end thereof. The strainer 36 for the air extraction siphon 32 is arranged at the open tip of the tube of the air extraction siphon 32 at the bridge apex. This strainer 36 in one contemplated embodiment is a flat disc that is lifted by a float 38 that slides up as the water rises within the siphon bridge 16. It should be noted that on a top surface of the disc may be a plurality of pin head size bumps that leave just enough space there above so only air and water pass through into the downward flowing tube of the air extraction siphon 32.

Therefore, as noted above, one of the three siphons used in the automatic aquarium system 10 is the bridge siphon 16. The bridge siphon 16 generally has a flat top surface that is slanted a predetermined amount to ensure that air bubbles may flow to the apex at the high end of the bridge siphon flat top surface. The bridge floor, which is arranged between the first and second leg, is also flat and inclined at a predetermined angle to ensure that non-floating waste may slide off into the second tank 14. It should be noted that the bridge 16 is shaped to have water flow upward from the pump leg before it flows back down through the opposite leg of the bridge siphon 16. Like most gravity powered siphons, the bridge siphon 16 has two legs that have open ends submerged in the water of two separate aquariums 12,14. Therefore, when one tank has a higher water level, water flows through the bridge 16 to the opposite or lower water level tank by gravity power. However, water cannot flow through the bridge 16 at start up until enough air is extracted which allows the water to elevate above the floor between the legs to allow for a back flow across the bridge siphon 16. Hence, the cross over siphon 28 is designed to solve the problem of water flowing when the bridge 16 is empty at startup.

The cross over siphon 28 as described above may be used to carry gallons of water per hour into the aquarium tank 12 that has the pump from the opposite tank 14, and then having the water returning through the bridge siphon 16. However, the cross over siphon 28 cannot do so until enough air is extracted to raise the water above the bridge floor. Therefore, the cross over siphon 28 may include a tube with a small hole or orifice 40 at its apex. This small hole 40 may allow air in the top of the cross over siphon 28 to block water flow until the air is expelled through the hole automatically by the rising water. Therefore, when the bridge water reaches a high enough level to do that the cross over siphon 28 starts carrying water to the pump inlet 20 instead of air. Therefore, the water volume going through the pump 18 may increase slightly with the flow from the two water inlets therein. It should be noted that the strainer 36 equipped on the cross over siphon 28 may be arranged on the second end of the siphon 28 which is formed by a tube arranged between one of the branches 26 of the inlet of the pump 20 and the second end of the tube which is arranged on or near a bottom surface of the second aquarium tank 14. The strainer 36 equipped second end of the cross over siphon 28, which is arranged in the second aquarium tank 14, may rest on the floor of the second aquarium tank 14. It should be noted that the inlet strainer 36 may be of any known shape, but has a cylindrical shape in the version shown in the drawings. After the bridge 16 is full to the top with water, all of the start up air may be gone and only water may circulate down to the pump until the air inlet 30 through the side of the bridge 16 is opened up. The aerated water created by the air inlet 30 will circulate through the cross over siphon 28 and bridge siphon 10 continuously at a rate of many gallons of water per hour from one tank to the other. It should be noted that other parts may used for the cross over siphon 28 other than the tube as shown in the drawings. It should be noted that the tube of the cross over siphon 28 may have any known length and diameter depending on the design requirements of the automatic aquarium system 10. It should also be noted that any known plastic, ceramic, composite, natural material, metal, or man made material may be used to form the tubing for the cross over siphon 28. The cross over siphon's first end which is connected to an inlet 26 of the pump may be connected via any known method, such as a press fit method or a clamp arranged there over or any other known mechanical or chemical fastening technique to allow proper sealing between the first end of the tube of the cross over siphon 28 and one of the three inlet ports of the pump 18.

The third siphon used in the automatic aquarium siphon system 10 of the present invention may be the air extraction siphon 32. At start up of the automatic aquarium system 10, the submerged pump 18 is full of water and the bridge 16 is full of air. Therefore, as the pump 18 runs water pressure at the pump inlet 20 is lower than air pressure in the bridge 16. Therefore, the air from the bridge apex may flow down through the air extraction siphon 32 into one of the inlet branches 24 of the pump 18. It should be noted that the air extraction inlet branch 24 of the pump 18 may have an angle of approximately forty five degrees to the pump 18 with an inner diameter of three thirty seconds of an inch. This inlet branch 24 may be just below another three thirty second inch inner diameter orifice. The velocity of water flow increases through the orifice, thus pressure therein decreases. Water speeding centrally down out of the orifice makes the lowest inlet pressure at approximately two psi. This two psi pressure occurs generally where the air from the down flowing air extraction siphon tube 32 enters the path to the pump 18. From there the accelerating turbulent mixture, which in one contemplated embodiment is roughly four parts water to one part air, races down into the pump 18, where the spinning impeller 40 breaks big bubbles into much smaller ones and then mixes them in the out flowing water. Hence, a stream of tiny bubbles diverted from the out flow may rise up to the top of the bridge 16 dissolving enough to enhance aeration of the water therein. After the bridge 16 is full very small air bubbles collect on the underside of its top. This is evidence that the circulating water is saturated with dissolved air in accordance with Henry's law. It should be noted that an air or water tube brace or bracket 58 may be secured to an inside surface of the bridge 16.

The automatic aquarium siphon system 10 of the present invention also includes an air inlet valve 30 arranged through a side surface of the siphon bridge 16. It should be noted that while the bridge 16 is filling with water, the air being removed keeps mixing with water and hence, keeps a good level of aeration within the water. However, when the last of the air is gone, aeration is maintained by lightly opening the air valve 30 by either twisting or rotating the valve to control the amount of air entering the bridge 16 in the form of bubbles that may rise and flow across the top of the bridge 16 into the apex strainer 36 just below the tip of the air extraction siphon tube 32. The aerated bubbles are valve regulated to make adequate aeration, but no more than what the pump 18 can remove as fast as they go in. It should be noted that the difference between negative water pressure inside the bridge 16 and air pressure outside of it at different elevations may be demonstrated by rotating the air inlet assembly in an arc from high to low. When the air admission tube is turned to its highest position, bubbles escape much faster than they do at its slowest position. The pressure differential is greater at higher elevations. It should be noted that the air inlet valve 30 may be connected to any length and diameter tube 44 that is arranged through and sealed properly from water egress through a side surface of the siphon bridge 16. It is also noted that an inlet cap 42 may also be arranged on a surface of the tube 44 to allow for proper positioning of the air inlet 30 valve and the air inlet tube 44 within the bridge 16. It should be noted that when the air inlet valve 30 is open a moving arc of air 46 generally may emit from the end of the air inlet tube 44 arranged within the bridge space. It should be noted that the bridge siphon 16 may also include a bridge apex top cap 48 arranged on an outside surface thereof, which may allow a sealed system to occur in the bridge siphon 16. The bridge top cap 48 may have any known shape, such as the circular shape shown in the present invention. However, any other known shape may be used for the bridge apex cap 48. The first end of the air extraction siphon 32 is arranged directly below the bridge apex top cap 48 and may have a strainer 36 arranged therebetween such that the strainer 36 is capable of contacting the top inner surface of the bridge siphon 16, wherein the strainer 36 may have a plurality of beads extending from a surface such that the beads interact with the top inside surface of the bridge siphon 16, thus keeping foreign matter and fishes from entering the first end of the air extraction siphon tube 32. It is also noted that a float 38 may be used, such that as the water level rises in the bridge siphon 16 the float 38 may move the strainer disc up towards the top or first end of the air extraction siphon tube 32. The opposite end or second end of the air extraction siphon tube 32 may be connected to the air inlet branch 24 which is arranged at a generally forty five degree angle on the submersed pump 18. The cross over siphon tube 28 may be connected to another of the three inlets of the pump. The primary water inlet tube may be connected to the third and final inlet branch 22 of the pump 18.

Figure 1:
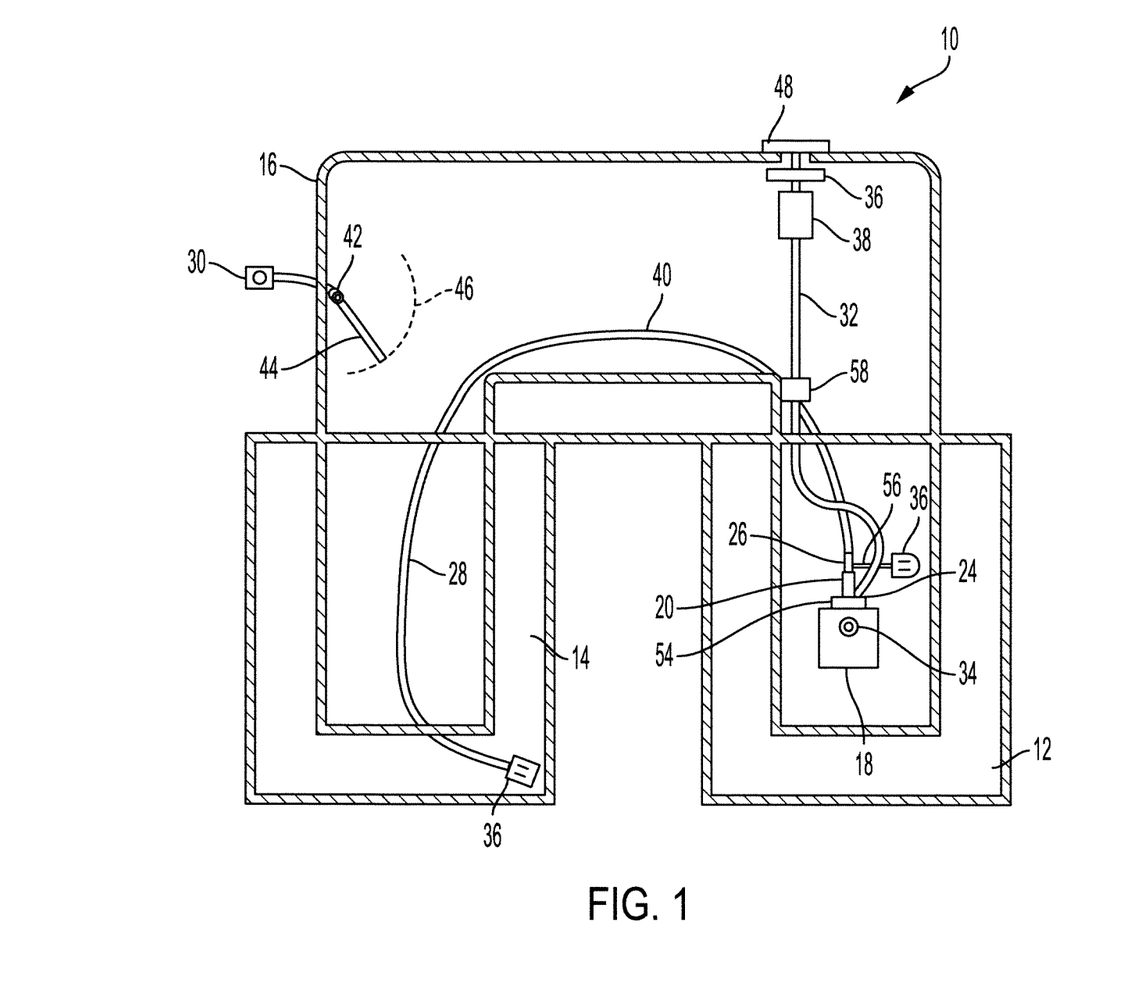
FIG. 1 shows a front view of an automatic aquarium system according to the present invention.
Figure 2:
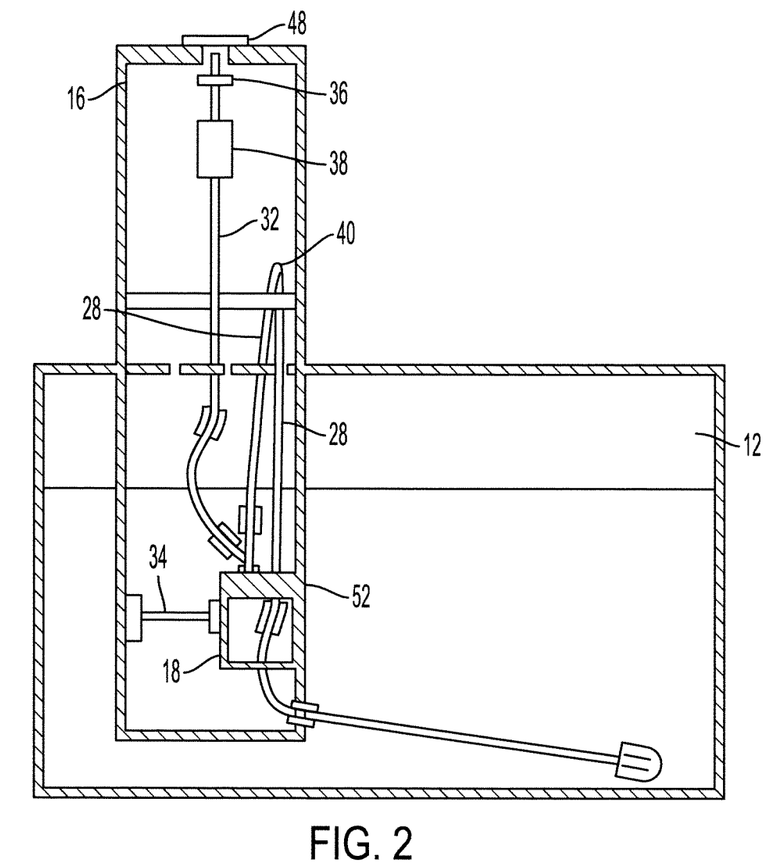
FIG. 2 shows a side view of an automatic aquarium system according to the present invention.
Figure 3:
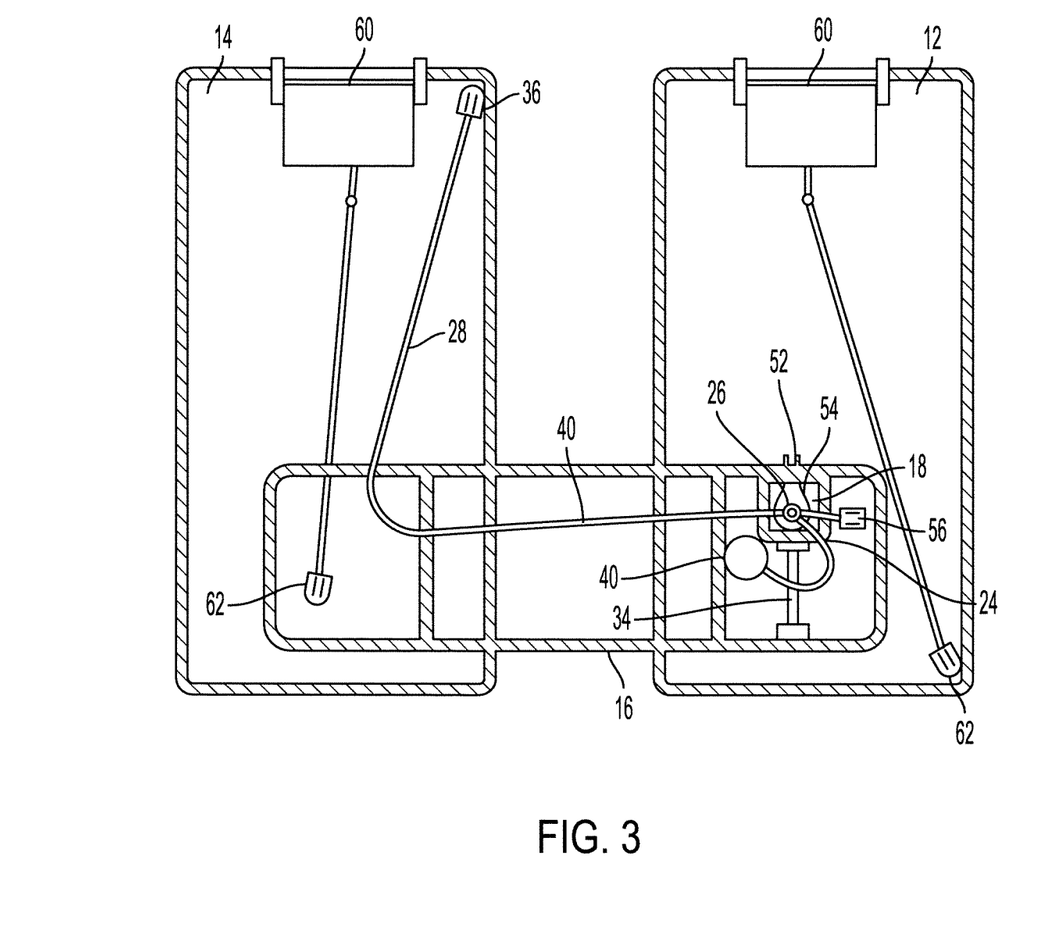
FIG. 3 shows a top view of an automatic aquarium system according to the present invention.
Figure 4:
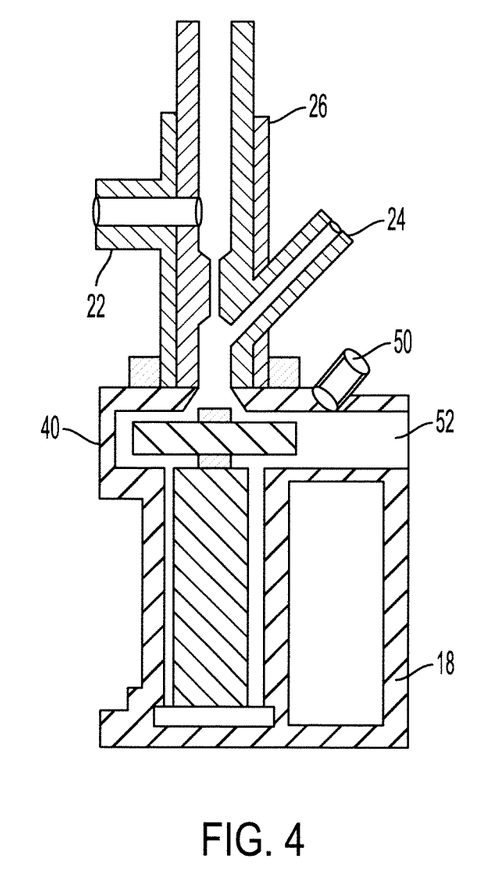
FIG. 4 shows a close up view of a submersible pump used in conjunction with the automatic aquarium system according to the present invention.

The automatic aquarium siphon system 10 may include any submersible pump 18. In one contemplated embodiment, a submersible mini pump 18 that is capable of moving one hundred and forty five gallons of water per hour is used. This pump 18 may have a motor that is one hundred and twenty volts, sixty hertz, at 0.18 amps and 36 hour rpm, a lift of approximately forty seven inches and an outlet size of one half inch diameter. This pump 18 also may include the controlled inlet branches 22,24,26 thereon. These inlet branches 22,24,26 are generally arranged on a top surface of the pump 18. The pump 18 may have a housing, an impeller cap 54, an out flow 52 and a bubble diverter 50 arranged from a top surface of the pump housing. Arranged off the top surface of the pump 18 may be the three inlet branches 22,24,26. As described above, the first inlet branch is an air inlet branch 24, which is connected to the second end of the air extraction siphon tube 32. It should be noted that the air inlet branch is arranged at approximately a forty five degree angle into the inlet member. The second inlet branch 26 generally extends directly from the top of the inlet member and is used to secure the second end of the cross over siphon tube 28 therein. The third inlet branch 22 is arranged on an opposite side from the air inlet branch 24 and is used to secure the second end of the primary water inlet tube 56 therein. The first end of the primary water inlet tube 56 extends a predetermined distance from the primary water inlet branch 22 and has a strainer 36 arranged on that first end thereof. It should be noted that the primary water inlet tube 56 may be arranged completely within the first leg of the bridge siphon 16. All of the tubing described herein and all of the strainers may be made of a plastic or metal material, however any other known plastic, ceramic, composite, metal, manmade material, or natural material may be used for any of the components described herein. It should be noted that the air inlet branch 24 of the pump inlet member may have a reduced diameter as it removes air from the top of the bridge 16. The primary water inlet branch 22 may be arranged perpendicular to a side portion of the inlet member. The cross over inlet branch 26 may be arranged at the top, below that a predetermined distance is the primary water inlet branch 22 and then below that a predetermined distance at a forty five degree angle is the air inlet branch 24. These three branches form the inlet member for the pump 18. Directly below the inlet member of the pump may be an impeller chamber which houses the impeller 54 therein, wherein the impeller is connected to a magnetic rotor housed within the housing of the pump 18. The pump 18 may also include a bubble diverter 50 arranged in a top surface thereof to allow for bubbles to escape from the out flow 52 of the pump 18 to allow for proper aeration of the water within the bridge 16. It should be noted that the out flow 52 of the submerged pump 18 may include a tube that extends through a surface of the first leg of the bridge siphon 16 such that it empties directly into the water of the first tank 12. However, in another contemplated embodiment, the out flow 52 may egress directly into the bottom portion of the first leg of the siphon bridge 16. It should be noted that any other number of inlets may also be used for the pump 18 depending on the size and number of bridges being used within the automatic aquarium system 10.

During operation of the automatic aquarium siphon system 10 after the tanks 12,14 and bridge 16 are assembled, water surface levels generally are placed an inch below the tank rims and the air inlet cap 30 is closed which makes the automatic aquarium system 10 ready to be turned on. Next, the pump 18 is positioned within the first leg of the bridge siphon 16 with its inlet on top so no air can be trapped therein. The impeller assembly of the pump 18 is the only mechanical moving part in the entire system 10. Next, to ensure adequate lubrication and cooling, the amount of air going through the pump 18 is no more than one fourth the amount of water. Therefore, the inside diameters of both the water inlet branches 22,26 of the pump inlet member are approximately twice as big as that of the air inlet branch 24 of the inlet system. Hence, air extracted from the bridge 16 may be replaced by an equal volume of water pushed up into the bridge 16 by atmospheric pressure. The water going in the bridge 16 via that route at a rate averaging approximately five or six cubic inches per minute, fills the bridge 16 of the automatic aquarium system 10 in about four hours. As the water gradually rises, the pressure above it drops. The rate of air extraction slows accordingly to the pressure drop. It should further be noted that water cannot move through the cross over siphon tube 28 until the rising water in the bridge 16 forces air out through the hole 40 at the apex of the cross over siphon tube 28. It should be noted that the hole 40 in the cross over siphon tube 28 may be of any known diameter. In operation, the aerated water from the second tank or opposite tank 14 that does not have the pump therein, may circulate through the cross over siphon 28 to the submerged pump 18 and then return to the second tank 14 through the bridge 16 in a continuous and automatic system. It should be noted that the bridge siphon 16 depicted is fourteen inches tall and has an interior pressure across the center of each of its two faces of approximately minus one forth psi compared to the exterior pressure. Therefore, one hundred square inches in the middle of those areas has a force of twenty five pounds pushing inward. Hence, these surfaces must be bendable but strong enough such that they are capable of concaving when the bridge 16 is full of water. The construction of such siphon bridge 16 must be strong enough to withstand these forces. It should be noted that taller siphons may have accordingly stronger differential pressures that they must survive. For example, at the top of a seven foot tall siphon the negative interior pressure is approximately minus three psi which makes the differential pressure of nearly one quarter of a ton per square foot. Furthermore, at the top of a water barometer, which is approximately thirty four feet tall, the differential pressure per square foot is more than a ton. It should be noted that the present invention may also be used in other siphon applications other than a siphon bridge 16 between two aquarium tanks 12,14. It should be noted that siphons, both overhead and inverted, are used today more than ever for all of their ancient purposes, plus a few modern applications. However, newer siphons for newer purposes would save valuable energy and natural resources if used correctly.

It should be noted that the present invention of an automatic aquarium siphon bridge used in an automatic aquarium system 10 provides easily observable evidence that siphons flow according to the difference in pressure between an inlet and an outlet. Therefore, it is contemplated that leak proof overhead siphons up to twenty five feet high which are filled by removing air and powered by gravity, may reliably carry water over obstacles at far better efficiency and much lower cost than a canal or water pump. Furthermore, pipeline siphons may be used with the present invention for water resource management such as a dam bypassed for upstream, downstream fish freedom and many other beneficial uses may also be realized with pipeline siphons. Also, it should be noted that aquarium siphons may include shapes and sizes limited only by the aquatic life therein, the atmospheric pressure and the imagination of the designer. It should further be noted that the use of the automatic aquarium siphon bridge in the present invention may allow for floating fish food pellets to be inserted via a feeding tool into an open bottom leg of the bridge 16, such that these food pellets inserted therein may rise to the top of the bridge 16. Hence, with the food arranged at the top end of the bridge 16 hungry fish naturally may find their way up there to feed, thus allowing for pleasant viewing of fish during feeding all via the use of a lightweight hand tool that makes the pellet insertion into an open leg of the siphon bridge 16 easy and practical.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. An automatic aquarium system, said system comprising:
   a first water tank;
   a second water tank;
   a siphon bridge arranged between said first water tank and said second water tank;
   a pump arranged in one leg of said siphon bridge;
   an air inlet tube extending through a surface of said siphon bridge;
   an air inlet valve arranged on an end of said air inlet tube;
   a cross over siphon arranged within said siphon bridge, one end of said cross over siphon is connected to an inlet of said pump; and
   an air extraction siphon arranged between a top surface of said siphon bridge and said inlet of said pump.

2. The automatic aquarium system of claim 1 wherein said pump is submerged at or near a bottom of said one leg of said siphon bridge.

3. The automatic aquarium system of claim 1 wherein said inlet of said pump has three flow controlled inlet branches.

4. The automatic aquarium system of claim 3 further comprising a primary water inlet tube connected on a first end thereof to a first branch of said inlet, a second end of said primary water inlet tube has a strainer thereon.

5. The automatic aquarium system of claim 3 wherein said cross over siphon has a tube, said tube of said cross over siphon is connected on a first end thereof to a second branch of said inlet of said pump arranged in said first tank, a second end of said tube is arranged in said second tanks and has a strainer arranged thereon.

6. The automatic aquarium system of claim 5 wherein said tube of said cross over siphon has an orifice therethrough at or near an apex thereof.

7. The automatic aquarium system of claim 3 wherein said air extraction siphon has a tube, said tube of said air extraction siphon is connected on a first end thereof to a third branch of said inlet of said pump, a second end of said tube of said air extraction siphon is arranged near said top surface of said siphon bridge.

8. The automatic aquarium system of claim 7 further comprising a bridge apex cap arranged on an outside surface of said siphon bridge.

9. The automatic aquarium system of claim 1 wherein said siphon bridge has an angled said top surface, said siphon bridge having water flow upward from a pump leg thereof and through said opposite leg.

10. The automatic aquarium system of claim 1 wherein said siphon bridge is a gravity powered water siphon.

11. The automatic aquarium system of claim 1 wherein said cross over siphon is a pump powered water siphon.

12. The automatic aquarium system of claim 1 wherein said air extraction siphon is a pump powered air siphon.

13. An automatic aquarium system, said system comprising:
 a first water tank;
 a second water tank;
 a siphon bridge arranged between said first water tank and said second water tank;
 a pump arranged in one leg of said siphon bridge;
 a cross over siphon arranged within said siphon bridge, one end of said cross over siphon is connected to an inlet of said pump;
 an air extraction siphon arranged between a top surface of said bridge and said inlet of said pump, said air extraction siphon has a tube, said tube of said air extraction siphon is connected on a first end thereof to a third branch of said inlet of said pump, a second end of said tube of said air extraction siphon is arranged near said top surface of said siphon bridge, said inlet of said pump having three flow controlled inlet branches; and
 a strainer disc and float arranged on said tube of said air extraction siphon.

14. A method of automatically moving aerated water between a first and second aquarium tank via a bridge, said method comprising the steps of:
 setting the first aquarium tank near the second aquarium tank;
 placing one leg of the bridge in the first aquarium tank and another leg of the bridge in the second aquarium tank;
 filling the first and second aquarium tanks with water to a predetermined level;
 arranging a pump in said one leg of the first aquarium tank;
 arranging a cross over siphon within the bridge between said pump and the second aquarium tank;
 arranging an air extraction siphon between said pump and a top surface of the bridge;
 arranging a primary water inlet tube from said pump; and
 turning on said pump and closing an air inlet valve.

15. The method of claim 14 wherein said pump has an inlet with three branches.

16. The method of claim 14 further comprising the step of circulating aerated water through said cross over siphon into said pump and then through the bridge.

17. The method of claim 14 wherein said cross over siphon, air extraction siphon and primary water inlet tube each has a strainer on an end thereof.

* * * * *